(No Model.)
T. C. AVERY.
BAKER FOR CLAMS.
No. 410,703. Patented Sept. 10, 1889.
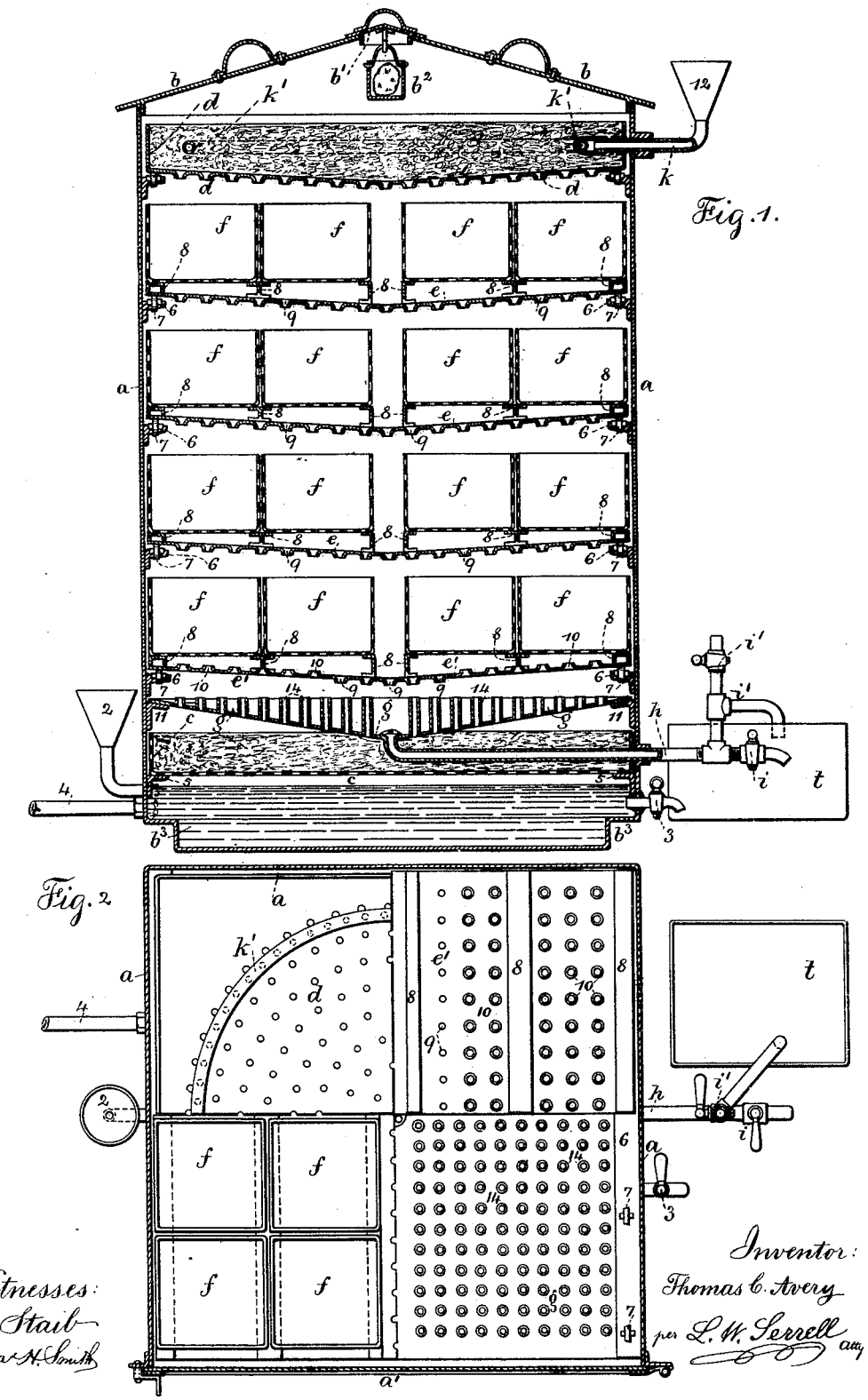

UNITED STATES PATENT OFFICE.

THOMAS C. AVERY, OF NEW YORK, N. Y.

BAKER FOR CLAMS.

SPECIFICATION forming part of Letters Patent No. 410,703, dated September 10, 1889.

Application filed April 25, 1889. Serial No. 308,596. (No model.)

*To all whom it may concern:*

Be it known that I, THOMAS C. AVERY, of the city, county, and State of New York, have invented a new and useful Improvement in Bakers for Clams, &c.; and the following is declared to be a full, clear, and exact description of the same.

The object of my invention is to supersede the well-known and old-fashioned method of producing what is termed a "Rhode Island clam-bake" by providing a portable or stationary baker in which the eatables are cooked by steam heat in the presence of seaweed, whereby all the advantages and characteristics of an old-fashioned clam-bake are preserved.

My invention consists of a metallic or brick case having a cover and door and a receptacle in the bottom for water, and said case is adapted to be supplied with live steam as a heating medium, or to be placed upon or over a fire of coals or embers, from which it derives its heat. Within said case there are perforated metal baskets or receptacles for sea-weed, a conical metal tray perforated with vertical pipes and adapted to catch the juice from the articles being cooked, and a pipe from this tray to deliver the juice outside the metallic case, and a pipe passing in at the upper portion of the case for the introduction again of the same liquid, and a circular pipe connected therewith and perforated on the under side, from which the liquid is discharged into the case. I provide concave perforated metal trays within the case, upon the surface of which are angle-iron ribs, and perforated metal baskets or receptacles for holding clams and other articles used in the make up of the clam-bake are set upon these ribs, and the trays and baskets are supported by angle-iron ribs secured to the case and having rollers, so that when the door is open any tray and its contents can be partially or entirely removed from the case.

In the drawings, Figure 1 is a vertical section through my improved apparatus, and Fig. 2 is a cross-section of the case and plan of various internal portions.

$a$ represents the case, which I prefer to make square, with a door $a'$, forming one side thereof.

$b$ is the main cover, and $b'$ an auxiliary cover, and there is a basket $b^2$ suspended from or placed below the auxiliary cover and designed to hold a potato to test the baking operation. The bottom of the case at $b^3$ is filled with water from the funnel 2 and can be emptied, or partially so, by the cock 3, and this water is heated to supply the case with steam for cooking by placing the case over or upon a bed of hot coals or embers, or steam can be supplied to the case through the pipe 4 from outside sources.

$c$ is a perforated metal basket or receptacle sitting over the water-receptacle and supported by angle-irons 5, secured to the inner sides of the case and adapted to hold sea-weed, and $d$ is a perforated metal basket or receptacle for sea-weed in the upper end of the case $a$, similarly supported.

$e$ $e'$ represent the concave metal trays, each supported by the angle-irons 6, secured to the sides of the case and resting on the rollers 7 of said angle-irons, and having angle-iron ribs 8 of varying height secured to their surface parallel to the irons 6, the upper surfaces of which are beveled. These trays $e$ are perforated with downward perforations at 9, except the lower tray $e'$, which has central downward perforations at 9 and upward perforations at 10.

$f$ represents the perforated metal or wire baskets or receptacles, which are preferably square, and the same rest upon the angle-irons 8 and are maintained level.

$g$ represents a conical metal tray having vertical pipes 14 passing up through it and resting upon angle-irons 11, and a pipe $h$ passes away from the lower central portion of the metal tray $g$ outside of the case and is provided with a cock $i$ and a siphon stand-pipe and cock $i'$. In the upper part of the case I provide an entrance-pipe $k$, funnel 12, and a circular pipe $k'$, connected with the pipe $k$ and perforated upon the under side. The pipe $k'$ is within the sea-weed receptacle.

The operation of the device is as follows: In the various baskets $f$ are placed clams, oysters, vegetables, or meats, or whatever is to be used for the make up of the clam-bake, each basket holding the allowance for one or more persons. The baskets $c$ and $d$ are filled with moist sea-weed and the bottom of the case with water. This is done either before the clam-bake party starts out for their trip or after they arrive at their destination. Steam to cook the contents of the baskets $f$ is now supplied either by the pipe 4 or from the water in the bottom of the case, which should be heated by placing the case over or upon a bed of hot coals, the steam in either case ascending up through the sea-weed and pipes of the tray $g$ and through all the trays and baskets of the case, baking and cooking the contents of the baskets, and also cooking the potato in the basket $b^2$, which, when done, serves to show that all the rest of the cooking operation is complete. The juice or liquid from the materials being baked drops from each and all of the baskets upon the concave metal trays $e$ and passes through the perforations 9 therein and falls on the materials and parts below and so on through the series of trays. The material falling on the lower tray $e'$ does not pass through the upward perforations 10, but seeks the center and goes through the downward perforations 9 upon the conical metal tray $g$, from which it is drawn off by the pipe $h$ and cock $i$ into a receptacle and caused to re-enter the case through the funnel 12 and pipes $k\ k'$ to maintain the moisture. Should the cock $i$ be closed, the liquid or juice will siphon out at $i'$ into the vessel $t$ when its level in the tray $g$ rises above the level of the siphon-pipe.

I claim as my invention—

1. The combination, in a clam-baker, of a case $a$, having a cover and door, a water-receptacle at $b^3$, comprising the bottom of the case, an open-work metal receptacle $c$ for sea-weed, extending entirely across the case and located directly above the water-receptacle, an open-work metal receptacle $d$ for sea-weed, also extending across the case and located in the top part thereof, and open-work metal baskets $f$ to hold the material to be cooked, located between the sea-weed receptacles, substantially as and for the purposes set forth.

2. The combination, in a clam-baker, of a case $a$, having a cover and door, a water-receptacle at $b^3$, comprising the bottom of the case, an open-work metal receptacle $c$ for sea-weed, extending entirely across the case and located directly above the water-receptacle, a receptacle $g$ for the juice or liquid directly above the sea-weed receptacle $c$ and a pipe therefrom for discharging the liquid, an open-work metal receptacle $d$ for sea-weed, also extending across the case and located in the top part thereof, and open-work metal baskets $f$ to hold the material to be cooked, located between the upper sea-weed receptacle and the receptacle $g$, and removable concave perforated metal trays $e\ e'$, for supporting the baskets $f$, substantially as and for the purposes set forth.

3. A clam-baking device consisting of a case $a$, having a cover and door, a water-receptacle at $b^3$, perforated metal receptacles $c\ d$ for sea-weed, concave perforated metal trays $e\ e'$, having ribs 8 thereon, perforated metal or wire baskets $f$ for the material to be cooked, the conical tray $g$, having vertical pipes passing through it and forming a receptacle for the juice, and a pipe $h$, for discharging the juice, and a funnel 12, and pipes $k\ k'$, for returning the same within the case, substantially as set forth.

4. The combination, in a clam-baker, with the case $a$, of the door $a'$, extending across one side, the cover $b$, the auxiliary cover $b'$, and the basket $b^2$, substantially as set forth.

5. The combination, in a clam-baker, with the case, door, and cover, of the sea-weed receptacles $c\ d$, the juice-receptacle $g$, having vertical pipes 14, the delivery-pipe $h$ and cock $i$, the siphon or overflow and cock $i'$, the return-pipes $k\ k'$, and funnel 12, substantially as set forth.

6. The combination, in a clam-baker, with the case, door, and cover, of the perforated metal trays $e\ e'$, the perforated metal or wire baskets $f$, the juice-receptacle $g$, having vertical pipes 14, and the delivery-pipe $h$ and cock $i$, substantially as set forth.

Signed by me this 19th day of April, A. D. 1889.

THOS. C. AVERY.

Witnesses:
GEO. T. PINCKNEY,
HAROLD SERRELL.